United States Patent
Garrett et al.

(10) Patent No.: US 9,201,945 B1
(45) Date of Patent: Dec. 1, 2015

(54) SYNONYM IDENTIFICATION BASED ON CATEGORICAL CONTEXTS

(71) Applicant: Google Inc., Mountain View, CA (US)

(72) Inventors: Zachary A. Garrett, Tokyo (JP); Takahiro Nakajima, Chiba (JP); Tasuku Oonishi, Tokyo (JP)

(73) Assignee: Google Inc., Mountain View, CA (US)

( * ) Notice: Subject to any disclaimer, the term of this patent is extended or adjusted under 35 U.S.C. 154(b) by 351 days.

(21) Appl. No.: 13/790,271

(22) Filed: Mar. 8, 2013

(51) Int. Cl.
*G06F 7/00* (2006.01)
*G06F 17/30* (2006.01)

(52) U.S. Cl.
CPC ...... *G06F 17/30598* (2013.01); *G06F 17/3071* (2013.01)

(58) Field of Classification Search
CPC .................................................. G06F 17/3071
See application file for complete search history.

(56) References Cited

U.S. PATENT DOCUMENTS

| | | | |
|---|---|---|---|
| 7,636,714 B1 | 12/2009 | Lamping et al. | |
| 7,941,419 B2 | 5/2011 | Bhatkar et al. | |
| 8,041,733 B2* | 10/2011 | Rouhani-Kalleh | 707/771 |
| 8,161,073 B2 | 4/2012 | Connor | |
| 2004/0199498 A1 | 10/2004 | Kapur et al. | |
| 2006/0031214 A1 | 2/2006 | Solaro et al. | |
| 2007/0203929 A1* | 8/2007 | Bolivar | 707/101 |
| 2008/0097982 A1* | 4/2008 | Gupta | 707/5 |
| 2009/0077047 A1* | 3/2009 | Cooper et al. | 707/4 |
| 2009/0248627 A1 | 10/2009 | Shahshahani et al. | |
| 2010/0121790 A1* | 5/2010 | Klinkott | 706/12 |
| 2010/0257171 A1* | 10/2010 | Shekhawat | 707/738 |

OTHER PUBLICATIONS

Voorhees, Ellen M., "Query Expansion Using Lexical-Semantic Relations," SIGIR '94 Proceedings of the 17th Annual International ACM SIGIR Conference on Research and Development in Information Retrieval, 9 pages, Aug. 1, 1994.

* cited by examiner

*Primary Examiner* — Fred I Ehichioya
*Assistant Examiner* — Kris Mackes
(74) *Attorney, Agent, or Firm* — Fish & Richardson P.C.

(57) ABSTRACT

Methods, systems, and apparatus, including computer programs encoded on a computer storage medium, for training recognition canonical representations corresponding to named-entity phrases in a second natural language based on translating a set of allowable expressions with canonical representations from a first natural language, which may be generated by expanding a context-free grammar for the allowable expressions for the first natural language.

18 Claims, 4 Drawing Sheets

```
┌─────────────────────────────┐
│   DETERMINE CO-OCCURRENCE   │──── 310
│   PROBABILITY DISTRIBUTION  │
└─────────────────────────────┘
              │
              ▼
┌─────────────────────────────┐
│     DETERMINE BACKGROUND    │──── 320
│   PROBABILITY DISTRIBUTION  │
└─────────────────────────────┘
              │
              ▼
┌─────────────────────────────┐
│     COMPARE PROBABILITY     │──── 330
│        DISTRIBUTIONS        │
└─────────────────────────────┘
              │
              ▼
┌─────────────────────────────┐
│          CALCULATE          │──── 340
│          SPECIFICITY        │
└─────────────────────────────┘
```

SYNONYM IDENTIFICATION BASED ON CATEGORICAL CONTEXTS

FIELD

This specification describes technologies related to search engines.

BACKGROUND

Systems that determine whether to make synonym substitutes based on contexts of co-occurring query terms often have a hard time learning good synonym rules for contexts that appear very infrequently. For example, learning that "restaurants" is a good synonym for "food" in the query [food in San Francisco] is relatively straightforward, because the volume of query traffic including the query term "San Francisco" is very large. For much smaller cities, such as Grey Bull, Wyo., the query stream may have never seen any supporting evidence for this synonym substitution.

SUMMARY

This specification presents implementations that identify categories that are well-suited to aid in identifying synonyms for query expansion.

For example, if "San Francisco" and "Grey Bull" are both cities, and "restaurants" is a good synonym for "food" in queries about San Francisco, the synonym relationship may apply to queries related to "Grey Bull" as well. Thus, the category "city" may be considered a useful category when identifying synonyms for query expansion in circumstances such as this.

In general, one innovative aspect of the subject matter described in this specification can be embodied in a method that includes identifying a category from a knowledge base, the category including a plurality of entities; identifying a set of queries including terms related to the entities included in the category from a query stream; calculating a specificity value for the category, based at least on the entities included in the category and the set of queries; and classifying the category as a coherent category, wherein a coherent category is a category whose specificity value satisfies a threshold.

Other embodiments include corresponding systems, apparatus, and computer programs, configured to perform the actions of the methods, encoded on computer storage media.

These and other embodiments may each optionally include one or more of the following features. For example, calculating a specificity value for the category may include determining a probability distribution for co-occurrence of the terms in the set of queries with the entities associated with the category; determining a background probability distribution for the occurrence of the terms in the set of queries; comparing the probability distribution of the co-occurrence of the terms in the set of queries with the entities associated with the category and the background probability distribution; and calculating a specificity value for the category, based on the comparing. In such an implementation, calculating the specificity value for the category may use a Kullback-Leibler (KL) divergence between the probability distribution for co-occurrence of the terms and the background probability distribution.

Additionally, in one implementation, the terms include individual words, while in another implementation the terms include individual words and aggregated sub-phrases. Implementations may further include determining that the category is a useful category when it is a coherent category and the category is associated with a number of entities that satisfies a threshold. Alternatively, an implementation may further include determining that the category is a useful category when it is a coherent category and the set of queries contains a number of queries that satisfies a threshold.

Particular embodiments of the subject matter described in this specification can be implemented so as to realize one or more of the following advantages. Embodiments are able to identify categories that are coherent categories, and may take into account additional information that indicates that a coherent category is a useful category for purposes of synonym substitution, as discussed above. Because embodiments are able to determine useful categories for synonym substitution, it is possible to take advantage of the benefits of synonym substitution to improve query performance Furthermore coherent and/or useful categories can be used exclusively to obtain better results than those that may result if categories that are determined as being not coherent or useful are used in synonym substitution.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

According to the subject matter described by this specification, categories that are effective in representing terms in query contexts can be differentiated from categories that are not effective in representing terms in contexts, when substituting synonyms to improve search results from queries. For example, it may be helpful to establish that "restaurants" is a good synonym for "food" in all queries that are of the form "food in<city>". Implementations provide a way to establish that the entities that fall within the category <city> is a useful category to substitute in this context.

Sometimes categories are not useful for analyzing the query stream. For example, if the category is too broad or not cohesive, it will not aggregate useful signals and may simply introduce noise. Overly broad categories, such as "literature subjects", or "risk factors" can include contents that are so diverse that knowledge that an entity belongs to the category is not very helpful. Even small categories may not be useful if they are not cohesive. To combat this problem, implementations determine category specificity. By comparing the co-occurring query words of an annotated category against the frequency those co-occurring words appear in the background distribution, helpful categories can be learned and unhelpful categories can be removed or omitted. Such a filtering process determines which categories are most helpful.

The embodiments described in this specification propose approaching the problem of identifying which categories are the most helpful by establishing the specificity of the categories. Various ways of establishing the specificity are possible. Some of these approaches involve comparing the probability distribution of the co-occurrence of the terms in the set of queries with the entities associated with the category with a background probability distribution for the occurrence of the terms in the set of queries.

As noted, a coherent category is defined as one whose specificity value satisfies a threshold. Since the specificity value is based on the difference between the probability distributions, as just discussed, thus a coherent category is a category where there is a sufficient amount of difference between the probability distribution of the co-occurrence of the terms in the set of queries with the entities associated with the category with a background probability distribution for the occurrence of the terms in the set of queries. Since different thresholds may be used in different implementations, different implementations may make different determinations about whether a category is coherent. However, as will be discussed below, in general there will be a greater difference between the probability distributions in situations where knowing that an entity from the category co-occurs with terms in the query provides a larger amount of information about other terms in the query. Thus, coherent categories are categories for which reliable co-occurrence relationships exist, and this property of coherent categories has an impact on their specificity scores.

Based on analyzing the difference between the probability distributions, it becomes possible to generate a specificity value for the category. The specificity value can be used to indicate how helpful the category is likely to be as a category for synonym substitutions as discussed above. For example, the specificity value may be compared to a threshold to decide if a category should be considered to be a coherent category. Coherent categories may be output for use in synonym substitution. Other factors may be considered when determining whether a coherent category is to be considered a useful category, such as the number of entities in the category or the number of queries in which entities from the category appear.

Various embodiments will now be discussed in connection with the drawings to explain their operation.

Figure 1:
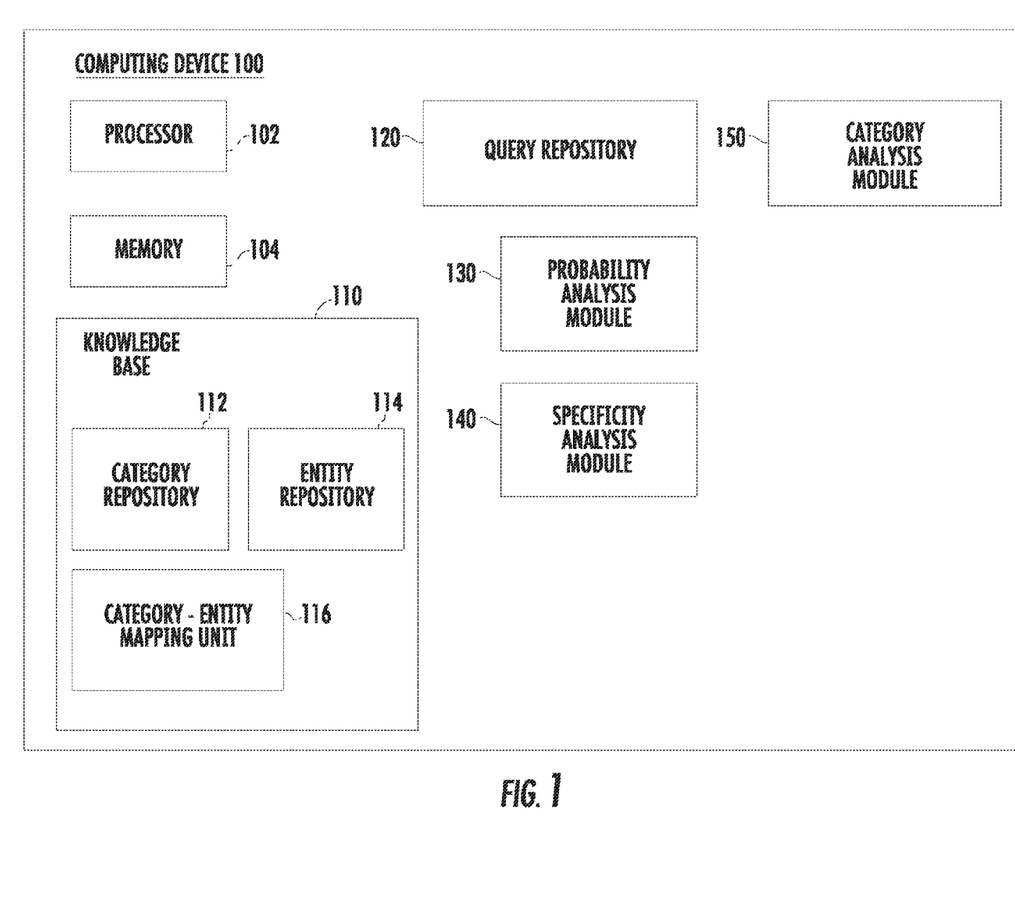
FIG. 1 is a block diagram of an example system that can determine which categories are useful for synonym substitution.

FIG. 1 is a block diagram of an example system that can determine which categories are useful for synonym substitution. Computing device 100 may be any type of computing device that includes a processor 102 and a memory 104 that is suitable for processing data. Thus, while computing device 100 may be a conventional personal computer, such as a desktop or a laptop, it may also be a mobile device, such as a smartphone or a tablet. Additionally, in some implementations, computing device 100 may operate over a distributed architecture or otherwise involve multiple constituent devices that communicate over a network.

Computing device 100 additionally includes knowledge base 110. While knowledge base 110 is shown in FIG. 1 as being local to computing device 100, knowledge base 110 may be accessed by computing device 100 via a network. For example, a product that may operate in the role of knowledge base 110 is Google's Knowledge Graph product. Knowledge base 110 includes a category repository 112, an entity repository 114, and a category-entity mapping unit 116. While a wide variety of architectures and implementations may provide the requisite functionality for knowledge base 110, what is necessary for knowledge base 110 to do what is needed for computing device 100 is that knowledge base provides a plurality of categories in category repository 112 for consideration for use in synonym substitution as discussed above. For example, categories may include categories such as "cities" or "things." Entity repository 114 may include specific entities that belong to those categories. For example, entities may include "Boston" or "Harmonica." For these examples, "Boston" is a city and "Harmonica" is a thing. Knowledge base 110 may include additional information about attributes of entities and other relationships between entities. However, what is necessary for implementations is information about categories and which entities are included in those categories. For example, information about which entities belong to which categories may be stored in a category-entity mapping unit 116. Various architectures may be used to store the information and relationships included in knowledge base 110.

Additionally, computing device 100 may include several additional modules. However, not all implementations will necessarily include all of these modules, and some implementations will also include other modules. For example, computing device 100 may include a query repository 120, a probability analysis module 130, a specificity analysis module 140, and a category analysis module 150. These modules provide the following functionality to embodiments. Query repository 120 includes a plurality of queries, which are used as raw data to ascertain the specificity of categories from knowledge base 110 that are considered for synonym expansion. Query repository 120 may include a plurality of queries that are all received from a single user, or a plurality of queries that are aggregated from a plurality of users.

Probability analysis module 130 analyzes the information from query repository 120 in combination with the information from knowledge base 110 about categories and entities. The operation of probability analysis module 130 will be discussed in greater detail below. At a high-level, the role of probability analysis module 130 is to construct two probability distributions. These probability distributions are a probability distribution of the co-occurrence of the terms in the set of queries with the entities associated with the category and a background probability distribution for the occurrence of the terms in the set of queries. Constructing these probability distributions is important because it allows implementations to characterize how much information becomes available based on the knowledge that a term in a category is included in a query. In general, coherent and useful categories are those for which knowing that a query term that is an entity from the category gives a large amount of information about which query terms are likely to co-occur.

Specificity analysis module 140 analyzes the difference between the probability distributions that were created by probability analysis module 140. The goal of the analysis is to establish that the category's distribution of co-occurring terms is significantly different from the background. The way in which this occurs is discussed in greater detail, below. The result of the operation of specificity analysis module 140 may be a measure of specificity, such as a specificity score. The specificity score may be numerical or may be other data that characterizes how useful the category is in predicting co-occurring terms.

Category analysis module 150 takes the result of the specificity analysis performed by specificity analysis module 140 and determines whether the category is a coherent category. A category may be considered to be a coherent category if its specificity score satisfies a threshold. Additionally, other information may be considered by category analysis module 150 when it attempts to determine whether a category should be considered to be a useful category. For example, for a category to be considered to be a useful category may require that the category include a certain threshold number of entities, or there may need to be a certain threshold number of queries related to the category.

Figure 2:
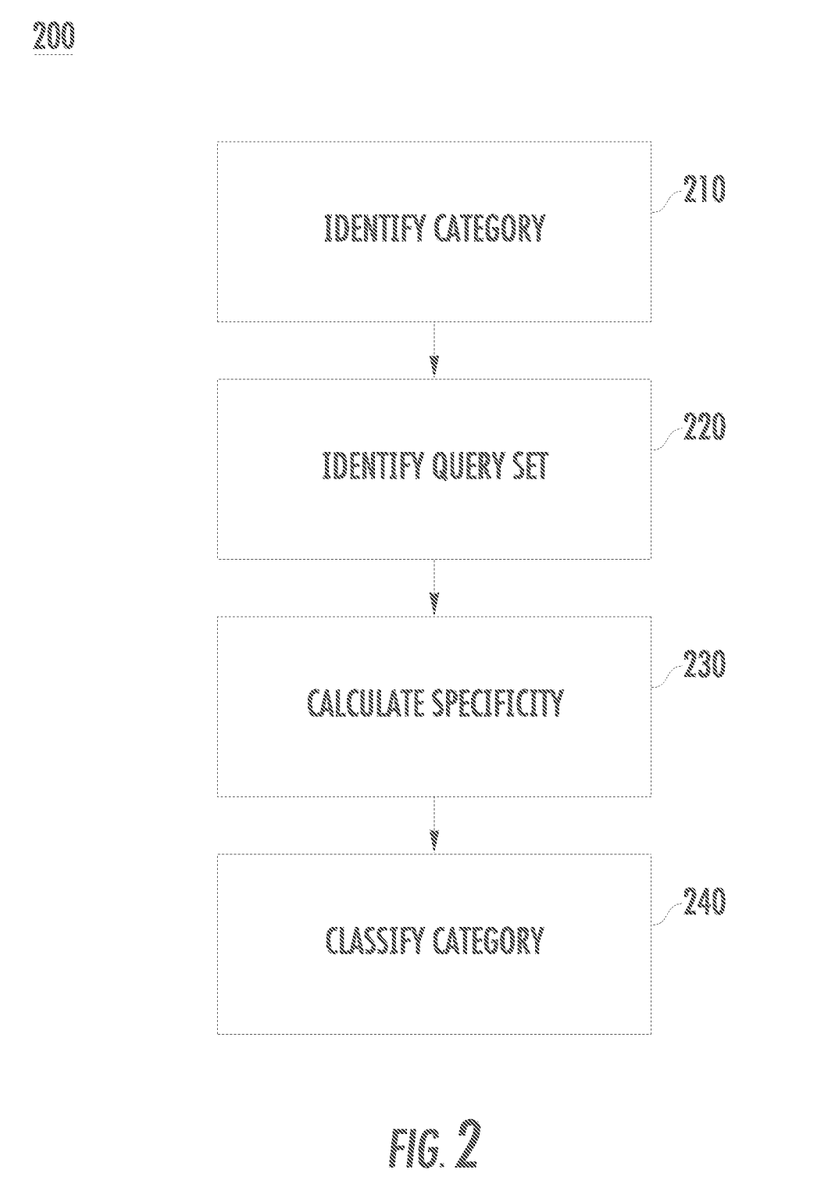
FIG. 2 is a flowchart of the stages involved in an example process to determine whether a category is a coherent category.

FIG. 2 is a flowchart of the stages involved in an example process to determine whether a category is a coherent category.

In block 210, a category is identified. Specifically, the category is identified from a knowledge base, the category including a plurality of entities. For example, the category may be one of the categories included in category repository 112 within knowledge base 110. The category may be associated with entities from entity repository 114, and the entities that are to be associated with the category may be identified from entity repository 114 by using category-entity mapping unit 116.

For example, some example categories might be "cities," "fruit," or "movies." Various categories may be more or less focused, or be associated with more or less numbers of entities. For example, a broad category might be "movie actors" while a more focused category might be "actors in Raiders of the Lost Ark." An entity that is associated with a category is an entity for which an "is-a" or a "belongs-to" relationship is satisfied between the entity and the category. For example, "apple" is a fruit, and it belongs to the category of fruit. Certain entities may fall into multiple categories. For example, "apple" is a computer company as well as a fruit. Additionally, some categories are more general categories that include all or part of other categories. For example, "beverages" is a more general category that includes the more specific category "wines." In this stage, knowledge base 110 provides a category such as "fruit" for further consideration, along with a set of all of the entities that it stores that belong to that category. For example, knowledge base 110 might list "apple," "orange," "grape," "cherry," "watermelon," "peach," and so on.

In some implementations, the goal is to provide a set of entities that is as exhaustive as possible for the category. In such implementations, the entire set of entities associated with a category will be used for the subsequent steps, but other implementations may additionally filter the set of entities to effectively present a sub-concept. For example, the category "fruit" may be filtered to only include fruits that are edible fruits, as certain entities may be fruits, such as poisonous berries, but it may be desirable to restrict the entity set to the common meaning of fruits, which includes edible fruits.

In block 220, a query set is identified. Specifically, a set of queries is identified that include terms related to the entities included in the category, from a query stream. For example, a plurality of queries may be stored in query repository 120. At this stage, queries are identified that include as terms entities in the category. It may be noted that the terms in the queries may be single words, or phrases that are considered for relationship to the entities. For example, suppose that the category is "fruit." Thus, queries for the query set would be queries that included as terms entities that belong to the category of fruit. For example, queries that are included might be "How many calories in an apple?" or "How much does a pound of grapes cost?" These example queries also can illustrate why "fruit" may be a useful category for synonym substitution. In these examples, "apple" and "grape" are relatively common examples of entities that are fruits.

However, there may be other fruits that are still fruits, but may be less commonly used in queries, such as "kiwi." A system may encounter queries such as "How many calories in a kiwi?" or "How much does a pound of kiwis cost?" By abstracting these queries to yield, "How many calories in a<fruit>?" or "How much does a pound of <fruit>cost?", a system becomes able to realize from the category and the context that the first query is about nutritional information and the second query is about pricing information, and is directed to learning such information about kiwis, instead of apples or grapes.

In block 230, specificity is calculated. Specifically, a specificity value is calculated for the category, based at least on the entities included in the category and the set of queries. A particular way of calculating specificity is detailed below, with respect to FIG. 3. A graphical portrayal of specificity is provided in FIG. 4. However, in general, the specificity is a measure of how much knowledge that a query includes an entity belongs to a category provides. The knowledge is based on the difference between queries that include an entity from the category versus queries in general. Specific categories may have significant co-occurrences. For example, the categories of "literary subjects" or "things" may be found not to be specific, because queries that include entities in these categories are so general and broad. By contrast, the category of "car model" may be judged to be a specific category, because queries with specific car models may have specific co-occurrences. Another specific category is "cities-towns-villages," that may co-occur with "hotel" or "road." Even categories that include a large number of members may be coherent, if they frequently co-occur with specific query terms.

In block 240, the category is classified. Specifically, the category is categorized as a coherent category, wherein a coherent category is a category whose specificity value satisfies a threshold. In block 230, the specificity is assigned a value. In some implementations, the specificity may be assigned a Boolean value, such as true/false, yes/no, or coherent/non-coherent. In such implementations, classifying the category simply requires classifying the category in a way that is in keeping with the Boolean value. In other implementations, the specificity may be a number, such as a real number in the range 0.0-1.0, or a percentage. In these cases, there may be a threshold value, and based on comparing the specificity to the threshold value, the category is determined to be coherent or non-coherent. For example, if the specificity is a real number in the range 0.0-1.0, a specificity of 0.5 or greater may be considered to designate a coherent category, and a specificity that is less than 0.5 may designate a category that is non-coherent.

Additionally, once the category has been classified as coherent or non-coherent, additional information may be considered to determine if the category should be considered useful or non-useful in synonym substitution. At a minimum, useful categories should be coherent categories. However, some implementations may require that coherent categories include a threshold minimum number of entities or relate to a threshold minimum number of queries in order to be considered to be useful. These considerations are important because if there are not satisfied, the category may lead to suggestions that are based on only limited contextual support. It will also be recognized that other information may be used to identify usefulness. For example, a particular user may indicate that he or she wishes a category to be considered useful based on empirical results.

Some embodiments will operate using a process which includes additional steps or omits certain steps, while remaining true to the overall goal of identifying categories that are useful for query expansion. As discussed above, some embodiments may use specific techniques to provide further conclusions and results.

Figure 3:
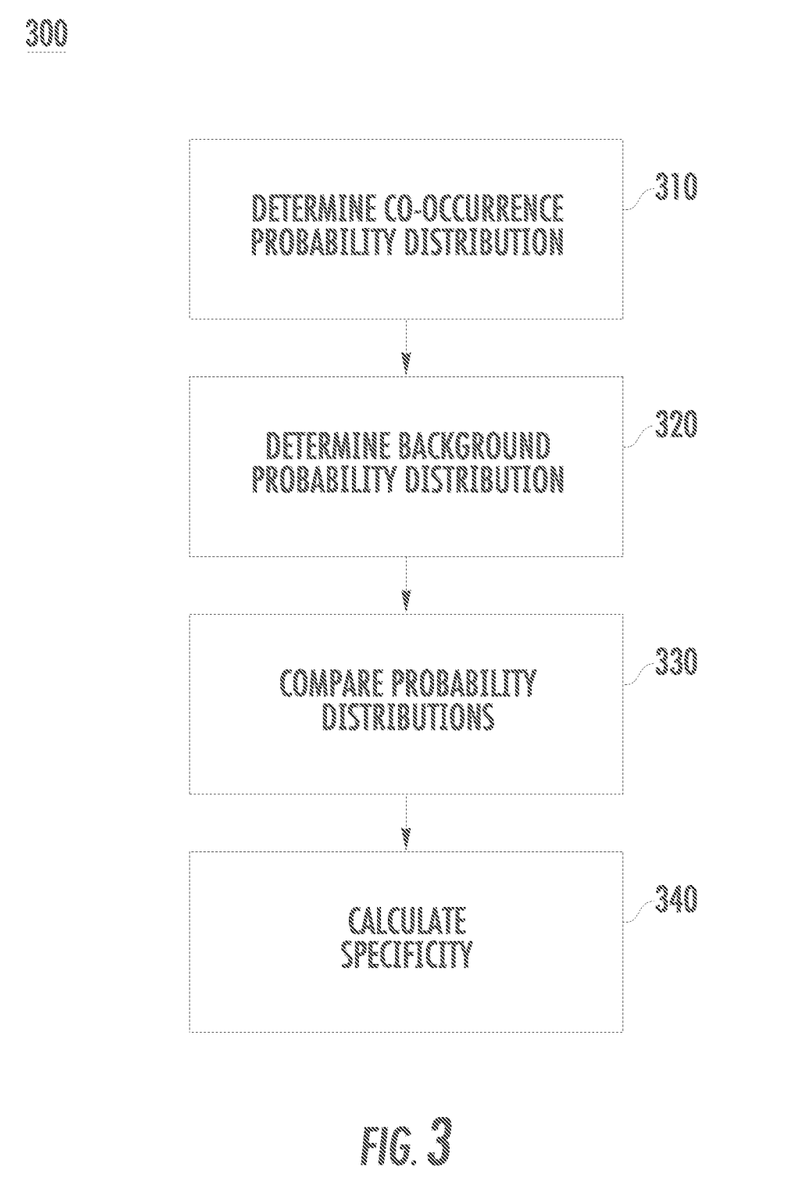
FIG. 3 is a flowchart of the stages involved in an example process to determine whether a category is a coherent category based on probability distributions.

FIG. 3 is a flowchart of the stages involved in an example process to determine whether a category is a coherent category based on probability distributions.

In block 310, a co-occurrence probability distribution is determined. Specifically, a probability distribution is determined for the co-occurrence of terms in the set of queries with the entities associated with the category. Such a probability distribution is the probability distribution P(W|Category), such as P(W|car_model). Here, W is the set of terms that may co-occur in queries with the category. For example, the terms "hotel" and "road" may co-occur in queries with terms that are categorized in the category of "cities/towns/villages." Hence, there may be various probabilities for co-occurrences between terms and entities in the category. An example of such a co-occurrence probability distribution is presented in FIG. 4. One aspect of the co-occurrence probability distribution is that it provides information that is distinct from the background because the knowledge that there is a term from the category in the query is a meaningful piece of information.

In block 320, a background probability distribution is determined. Specifically, a background probability distribution is determined for the occurrence of the terms in the set of queries. Such a probability distribution is the probability distribution P(W). This probability distribution is simply the probability of the occurrence of a certain number of terms in the query. This probability distribution is based on less information than the probability distribution of block 310, because it simply is based on term occurrence, without the category knowledge being available.

In block 330, the probability distributions are compared. Specifically, the probability distribution of the co-occurrence of the terms in the set of queries with the entities associated with the category is compared with the background probability distribution. The objective of comparing the probability distributions is to ascertain if knowledge of the category leads to a significant difference in the distribution of co-occurring terms. While an example will be provided in FIG. 4, in general categories may be categorized as "coherent" and "non-coherent."

Coherent categories are categories in which knowing that a query includes an entity in the category reliably indicates that there will also be, in the query, co-occurring terms. Thus, whether a category is coherent or not is not simply based on the number of entities in the category, but how much information knowing an entity from the category is in the query provides about what context to expect. Thus, comparing the probability distributions should involve some way of establishing that the probability distributions are, in fact, significantly different. When the probability distributions are significantly different, this implies that knowledge of the category provides knowledge about what the context of the entity in the query is likely to be. As such, the category is a coherent category that is likely to be of use in synonym replacement.

In block 340, the specificity is calculated. Specifically, the specificity value for the category may be calculated based on the comparing. One way to obtain a specificity value is a Kullback-Leibler (KL) divergence between the two probability distributions. The Kullback-Leibler divergence is also known as information divergence, information gain, or relative entropy. It is a measure of the information lost when P(W) is used to approximate P(W|C). It is useful to use such a metric, because coherent categories are those in which P(W|C) includes a large amount of information that is not captured by P(W).

The formula for this metric in the application used in implementations is Equation (1):

$$S(C) = KL_W(P(W|C) \| P(W)) = \Sigma_W(P(W|C) * \log(P(W|C)/P(W))) \quad (1)$$

In Equation (1), W refers to co-occurring query words and C is a category. The "∥" denotes taking the Kullback-Leibler divergence between these two distributions. It will be recognized that other ways exist of measuring the difference between the distributions. Whether the KL divergence or another metric is used, the metric of the difference should yield the specificity score for classifying the category as coherent or non-coherent.

Figure 4:
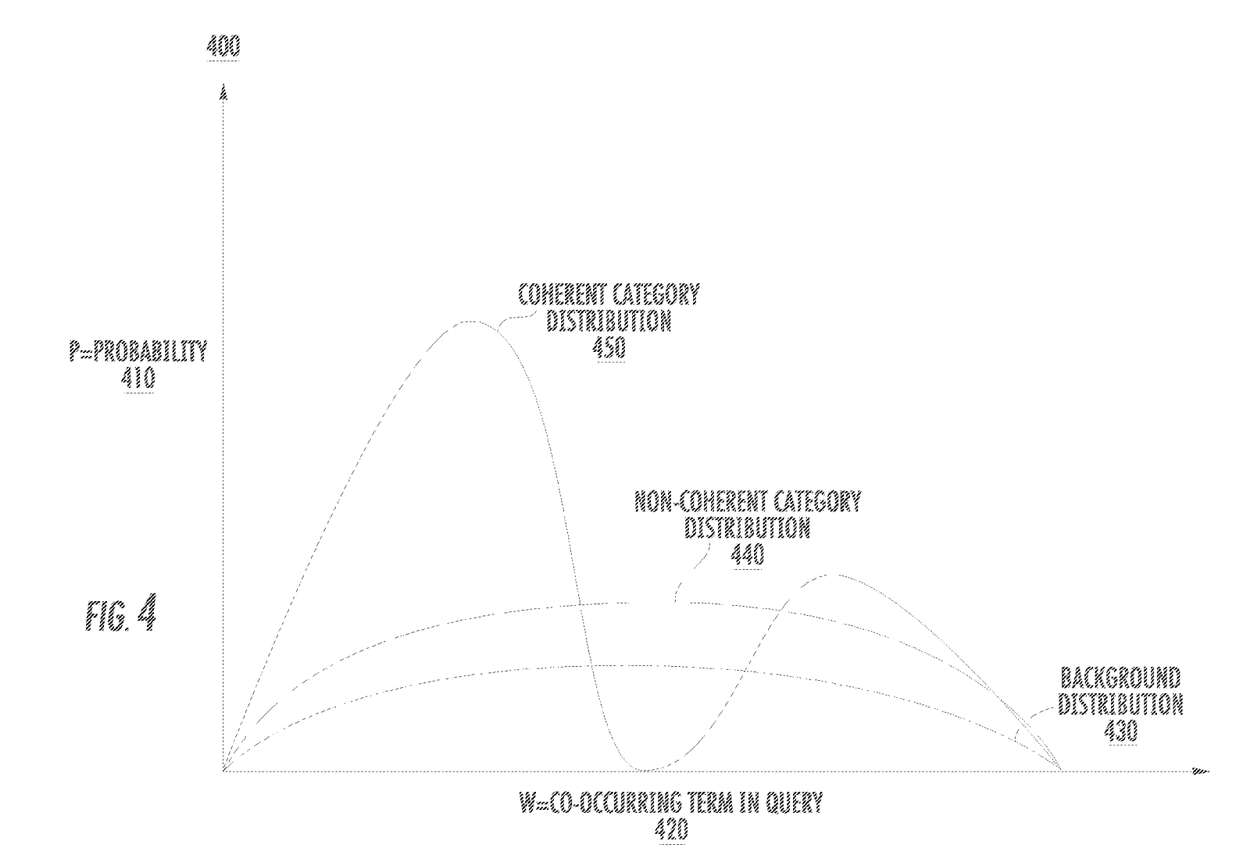
FIG. 4 is a graph of sample probability distributions that illustrate the difference between coherent categories and non-coherent categories.

FIG. 4 is a graph of sample probability distributions that illustrate the difference between coherent categories and non-coherent categories.

Graph 400 depicts several probability distributions that illustrate the relationship between category distributions. The axes of graph 400 are probability (P) 410 as the vertical axis and a number of co-occurring terms in a query (W) 420. In the context of graph 400, a query may include terms [A B C D E], where B is a term that belongs to a category. As can be seen in graph 400, three distributions are plotted on the graph. The first distribution, background distribution 430, is a distribution of the probability that a given quantity of terms will appear in the query. As can be seen on graph 400, the background distribution 430 is roughly symmetrical, with a single peak that is centered around a mean value. As can be seen, non-coherent category distribution 440 is quite similar to background distribution 430. Non-coherent category distribution 440 is similar to background distribution 430 because there is no significant co-occurrence between terms from the non-coherent category and other terms in queries. For example, suppose that a non-coherent category is "things." Such a category is extremely general. As a result, simply knowing that a "thing" is part of a query does not give any particular information about what will co-occur in the query because that category is so general.

By contrast, coherent category distribution 450 includes two peaks. These peaks are present because coherent category distribution 450 is based on a category that will frequently co-occur with certain terms from the query. Hence, it has peaks that represent that there will be patterns in the queries such that terms co-occur. For example, "cities-towns-villages" will co-occur with "hotel" and "road", so there will be a meaningful distinction between the distribution for these terms for queries which are known to possess a "cities-towns-villages" entity and the general population of queries.

Thus, implementations provide functionality that allows a determination if a category is likely to be a helpful category in synonym substitution in query expansion. As discussed, categories in a knowledge base include a plurality of entities. Implementations perform analysis based on a set of sample queries and the set of entities to ascertain how much information knowing that one or more of the entities is present in the query provides about co-occurrence of other terms in the query. Based on the analysis, implementations can classify categories as coherent where knowing that entities in the category provide significant clues as to what other terms will co-occur in the queries.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    identifying a category from a knowledge base, the category including a plurality of entities;
    identifying a set of queries including terms related to the entities included in the category from a query stream;
    calculating a specificity value for the category, based at least on the entities included in the category and the set of queries, comprising:
        determining a probability distribution for co-occurrence of the terms in the set of queries with the entities associated with the category;
        determining a background probability distribution for the occurrence of the terms in the set of queries; and
        comparing the probability distribution of the co-occurrence of the terms in the set of queries with the entities associated with the category and the background probability distribution to obtain the specificity value for the category; and
    classifying the category as a coherent category, wherein a coherent category is a category whose specificity value satisfies a threshold.

2. The method of claim 1, wherein calculating the specificity value for the category uses a Kullback-Leibler (KL) divergence between the probability distribution for co-occurrence of the terms and the background probability distribution.

3. The method of claim 1, wherein the terms comprise individual words.

4. The method of claim 1, wherein the terms comprise individual words and aggregated sub-phrases.

5. The method of claim 1, further comprising determining that the category is a useful category when it is a coherent category and the category is associated with a number of entities that satisfies a threshold.

6. The method of claim 1, further comprising determining that the category is a useful category when it is a coherent category and the set of queries contains a number of queries that satisfies a threshold.

7. A system comprising:
    one or more computers and one or more storage devices storing instructions that are operable, when executed by the one or more computers, to cause the one or more computers to perform operations comprising:
    identifying a category from a knowledge base, the category including a plurality of entities;
    identifying a set of queries including terms related to the entities included in the category from a query stream;
    calculating a specificity value for the category, based at least on the entities included in the category and the set of queries, comprising:
        determining a probability distribution for co-occurrence of the terms in the set of queries with the entities associated with the category;
        determining a background probability distribution for the occurrence of the terms in the set of queries; and
        comparing the probability distribution of the co-occurrence of the terms in the set of queries with the entities associated with the category and the background probability distribution to obtain the specificity value for the category; and
    classifying the category as a coherent category, wherein a coherent category is a category whose specificity value satisfies a threshold.

8. The system of claim 7, wherein calculating the specificity value for the category uses a Kullback-Leibler (KL) divergence between the probability distribution for co-occurrence of the terms and the background probability distribution.

9. The system of claim 7, wherein the terms comprise individual words.

10. The system of claim 7, wherein the terms comprise individual words and aggregated sub-phrases.

11. The system of claim 7, further comprising determining that the category is a useful category when it is a coherent category and the category is associated with a number of entities that satisfies a threshold.

12. The system of claim 7, further comprising determining that the category is a useful category when it is a coherent category and the set of queries contains a number of queries that satisfies a threshold.

13. A non-transitory computer-readable storage medium storing software comprising instructions executable by one or more computers which, upon such execution, cause the one or more computers to perform operations comprising:

identifying a category from a knowledge base, the category including a plurality of entities;

identifying a set of queries including terms related to the entities included in the category from a query stream;

calculating a specificity value for the category, based at least on the entities included in the category and the set of queries, comprising:

determining a probability distribution for co-occurrence of the terms in the set of queries with the entities associated with the category;

determining a background probability distribution for the occurrence of the terms in the set of queries; and         comparing the probability distribution of the co-occurrence of the terms in the set of queries with the entities associated with the category and the background probability distribution to obtain the specificity value for the category; and     classifying the category as a coherent category, wherein a coherent category is a category whose specificity value satisfies a threshold.

14. The medium of claim 13, wherein calculating the specificity value for the category uses a Kullback-Leibler (KL) divergence between the probability distribution for co-occurrence of the terms and the background probability distribution.

15. The medium of claim 13, wherein the terms comprise individual words.

16. The medium of claim 13, wherein the terms comprise individual words and aggregated sub-phrases.

17. The medium of claim 13, further comprising determining that the category is a useful category when it is a coherent category and the category is associated with a number of entities that satisfies a threshold.

18. The medium of claim 13, further comprising determining that the category is a useful category when it is a coherent category and the set of queries contains a number of queries that satisfies a threshold.

\* \* \* \* \*